US005211063A

United States Patent [19]

Hobmaier et al.

[11] Patent Number: 5,211,063

[45] Date of Patent: May 18, 1993

[54] MEASURING DEVICE WITH SEVERAL SENSORS IN MULTIPLEX

[75] Inventors: Daniel Hobmaier, La Rippe; José Barros, Geneva, both of Switzerland

[73] Assignee: Baumer Electric AG, Frauenfeld, Switzerland

[21] Appl. No.: 623,015

[22] Filed: Dec. 6, 1990

[30] Foreign Application Priority Data

Dec. 6, 1989 [CH] Switzerland ..................... 4381/89-5

[51] Int. Cl.[5] ..................... G01D 21/00; G01B 21/00

[52] U.S. Cl. ............................. 73/866.1; 324/207.14; 324/207.23; 324/207.25; 340/870.11

[58] Field of Search ..................... 73/866.1, 772, 625, 73/626, 641, 862.04–862.07, 861.66, 510–512, 717–722, 736; 324/207.14, 207.23, 207.25; 250/231.16, 231.18; 356/375; 340/870.11–870.14, 870.16, 870.17, 870.02, 870.03

[56] References Cited

U.S. PATENT DOCUMENTS

| | | | |
|---|---|---|---|
| 2,719,428 | 10/1955 | Lambie | 73/866.1 X |
| 3,199,508 | 8/1965 | Roth | 340/870.11 X |
| 3,253,260 | 5/1966 | Hawley | 340/870.11 |
| 4,041,442 | 8/1977 | Marquardt | 367/135 |
| 4,466,189 | 8/1984 | Tobin, Jr. | 324/207.23 X |
| 4,628,738 | 12/1986 | Burckhardt et al. | 73/626 |
| 4,719,420 | 1/1988 | Boimond | 324/207.14 |
| 4,774,464 | 9/1988 | Kubota | 324/207.25 |
| 4,923,117 | 5/1990 | Adams et al. | 340/501 X |
| 4,952,874 | 8/1990 | Stadtfeld | 324/207.25 X |
| 4,956,999 | 9/1990 | Bohannan et al. | 73/587 |
| 5,140,257 | 8/1992 | Davis | 340/870.16 X |
| 5,159,931 | 11/1992 | Pini | 73/626 X |
| 5,168,873 | 12/1992 | Seifert et al. | 356/375 X |

FOREIGN PATENT DOCUMENTS

| | | | |
|---|---|---|---|
| 754863 | 1/1953 | Fed. Rep. of Germany | 73/866.1 |
| 868768 | 2/1953 | Fed. Rep. of Germany | 73/866.1 |
| 2160080 | 6/1973 | Fed. Rep. of Germany | 340/870.11 |
| 1252751 | 8/1986 | U.S.S.R. | 73/866.1 |
| 1392350 | 4/1988 | U.S.S.R. | 324/207.25 |
| 946947 | 1/1964 | United Kingdom | 324/207.23 |

*Primary Examiner*—Tom Noland
*Attorney, Agent, or Firm*—Woodard, Emhardt, Naughton, Moriarty & McNett

[57] ABSTRACT

A measuring device comprising two or more sensors for one or several values to be measured, these sensors being arranged so as to be connected to an electric power supply and to provide, through output lines, signals which are a function of the value to be measured, the device further comprising transmission and processing devices for the output signals from the sensors.

9 Claims, 3 Drawing Sheets

MEASURING DEVICE WITH SEVERAL SENSORS IN MULTIPLEX

BACKGROUND OF THE INVENTION

The present invention relates to a measuring device comprising two or more sensors for one or several values to be measured, these sensors being arranged so as to be connected to an electric power supply and to provide, through output lines, signals which are a function of the value to be measured, the device further comprising transmission and processing devices for the output signals from the sensors.

The invention is more particularly applicable to a device for indicating the absolute angular position of a shaft, comprising position sensors with a rotatable member, the rotatable member of a first sensor being coupled mechanically with said shaft, and the rotatable members of the other sensor or sensors being coupled successively with that of the first sensor through gears, these sensors being arranged so as to be supplied with a sinusoidal or a pulsed voltage and to provide output signals which are a function of the angular position of their rotatable member.

In such devices, the sensors must be connected, on the one hand, to a power supply and, on the other hand, to a device for processing their output signals. In the case of inductive sensors, for example of the resolver type, these output signals appear at the terminals of two phases and, accordingly, require up to four lines per sensor for their transmission to the processing device, generally located at a certain distance from the sensors. When used for measuring the angular position of a shaft, the number of sensors which are needed depends upon the operational range of the device, i.e. on the maximum number of revolutions of the input shaft that the device can indicate, so that a large number of connecting lines are often necessary, which in practice constitutes an important drawback.

In order to limit the number of connection lines which are necessary in this particular case, one can use, between the different sensors, gears with a high reduction ratio, so as to reduce the number of sensors necessary for a given operational range. However, this solution requires sensors and gears which are highly accurate and, accordingly, it leads to relatively high cost prices for the whole device.

The invention is aimed at providing a device of the aforementioned type in which the number of connection lines between the sensors, a signal processing device and a power supply device, can be reduced to a significant extent, while at the same time achieving a cost price reduction for the whole device, which can be substantial in certain cases.

SUMMARY OF THE INVENTION

For this purpose, the device according to the invention comprises a power transmission and multiplexer unit connected to said sensors and further connected, on the one hand, to a signal processing device by means of a number of lines at least approximately equal to that of said output lines of a single sensor and, on the other hand, to a power supply and multiplexer control device.

The number of connection lines thus becomes independent of the number of sensors. In the above mentioned particular case of the device for measuring the angular position of a shaft by means of inductive sensors, the number of sensors can, for example, be increased in such a manner as to enable the use of lower reduction ratios or, more generally, of a lower number of teeth and, therefore, of gears which are appreciably cheaper.

On the other hand, the first sensor, which is directly coupled to the input shaft the angular position of which is to be measured, is generally the only one which has to be highly accurate, i.e. to have the accuracy needed for indicating the angular position of the shaft during one revolution thereof, the other sensors being used for indicating the number of full revolutions accomplished by the shaft between an initial position and a final position and requiring an an accuracy only sufficient for determining this number of revolutions, which accuracy requirement decreases as the reduction ratio which is used. Actually, sensors of a very cheap construction can be made, for example sensors which are based on the principle of the variation of the coupling between a primary winding and secondary windings in phase quadrature, and which use a passive movable member, which sensors are capable of delivering signals of the same format as that of inductive sensors of the resolver type, which are appreciably more expensive.

According to a particular embodiment of the device according to the invention, the addressing of the different sensors in multiplex mode is carried out in an extremely simple matter, by using coding in relation with the supply voltage, which only requires the two power supply lines for the transmission of the address information. Different preferred embodiments of the present device are described hereafter.

BRIEF DESCRIPTION OF THE DRAWINGS

Further objects, advantages and specific features of the present device will become more apparent from the following description of an exemplary bodiment, illustrated in the appended drawings, wherein.

DESCRIPTION OF THE PREFERRED EMBODIMENT

Figure 1:
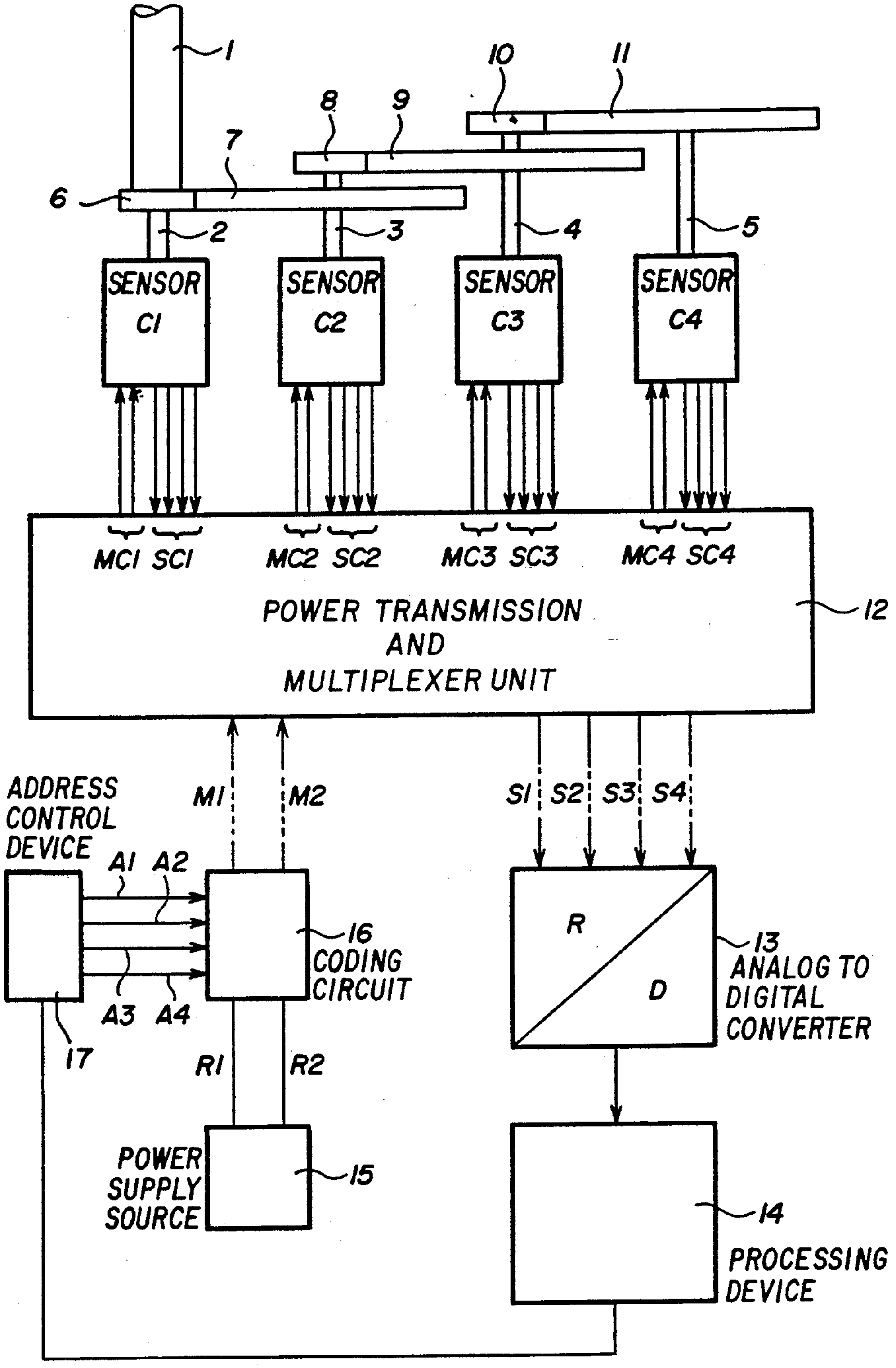
FIG. 1 is a block diagram of a device according to the invention for measuring the angular position of a shaft.

According to FIG. 1, an input shaft 1, of which the absolute angular position is to be indicated, i.e. the position with respect to an initial position, inclusive of the number of full revolutions accomplished between these positions, is mechanically coupled with a first position sensor C1, which in this case consists of a resolver. This sensor C1 is supplied in current through two lines generally designated MC1 and provides output signals through four lines generally designated SC1.

FIG. 1 further shows, in an exemplary embodiment which is not intended to be limiting, three other sensors C2, C3 and C4, which could also be resolvers, but which preferably consist of inductive sensors with a passive movable member providing output signals of the same format as a resolver and which, accordingly, can be processed by the same converter device. The rotatable members of these sensors C1 to C4, mounted on respective shafts 2, 3, 4, 5 are coupled in series, i.e. each one with that of the preceding sensor, by means of gears, for example of reducing gears such as 6, 7 between C1 and C2, 8, 9 between C2 and C3, 11 between C3 and C4. The reduction ratio can be 16:1 for example, which makes it possible to make these gears at a very low cost price by comparison with gears having for example ratios of 100:1, as are normally used in such a device. In the case of a coupling of the master-vernier type between the sensors, it is advantageous to use, similarly, a number of teeth lower than that of the usual devices of this type, for example through the use of master-vernier ratios of 16:17.

The power supply lines of the sensors C2 to C4 and the lines connecting their output terminals to a power transmission and multiplexer unit 12 are designated, respectively, MC2, MC3, MC4 and SC2, SC3, SC4, in a similar manner to those of sensor C1.

The power transmission and multiplexer unit 12 is mounted in the vicinity of the sensors, for example on a machine such as an industrial robot, and is connected to a signal processing device represented diagrammatically by the blocks 13, 14, as well as to a power supply and multiplexer control device represented by blocks 15, 16, 17. As indicated in FIG. 1, this connection is achieved, on the one hand, by means of four lines S1, S2, S3, S4 and, on the other hand, by means of two lines M1, M2, i.e. by a total of six lines. The signals appearing at the lines S1 to S4 are first processed in the block 13, which in the illustrated embodiment consists mainly of an analog to digital converter R/D, for transforming the analog signals of the resolver format into digital signals, which will then be further processed in a processing device 14 for the purpose of determining the angular position of the input shaft and/or the rotational speed of this shaft.

A power supply source for the sensors and the unit 12 is indicated by the block 15. It provides, via the two lines R1, R2, a sinusoidal or a periodical pulsed voltage, to a coding circuit 16 which is connected to the unit 12 via the lines M1, M2.

The selection of the sensors C1 to C4 for the transmission of the corresponding output signals to device 13 in multiplex mode is carried out under the control of addressing signals sent through the lines A1, A2, A3, A4, as indicated schematically in FIG. 1, by a control device 17 connected to the processing device 14.

Figure 2:
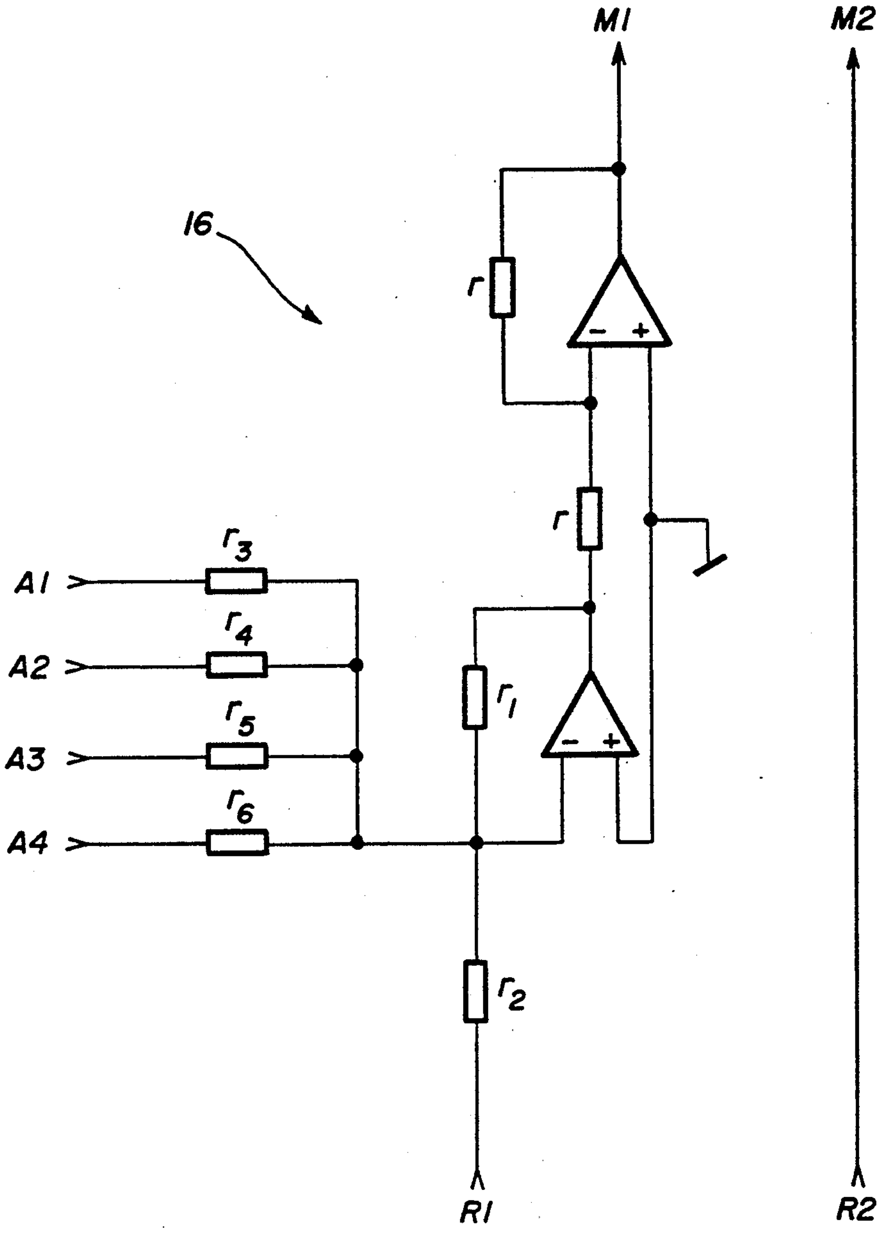
FIG. 2 is a diagram of a multiplexer control device which is part of the device of FIG. 1.

FIG. 2 shows diagrammatically the circuit 16 of an exemplary embodiment which enables the superposition on the supply voltage applied between R1 and R2, of different shift voltages defined, respectively, by the level of DC voltages applied selectively to the lines A1 to A4. The superposed DC voltages, determined for example by the choice of the resistors r1 to r6 of FIG. 2, preferably have values significantly lower than the supply voltage, but must, of course, be sufficient to enable easy discrimination. It should also be noted that the potentials of M1 and M2 are floating potentials.

Figure 3:
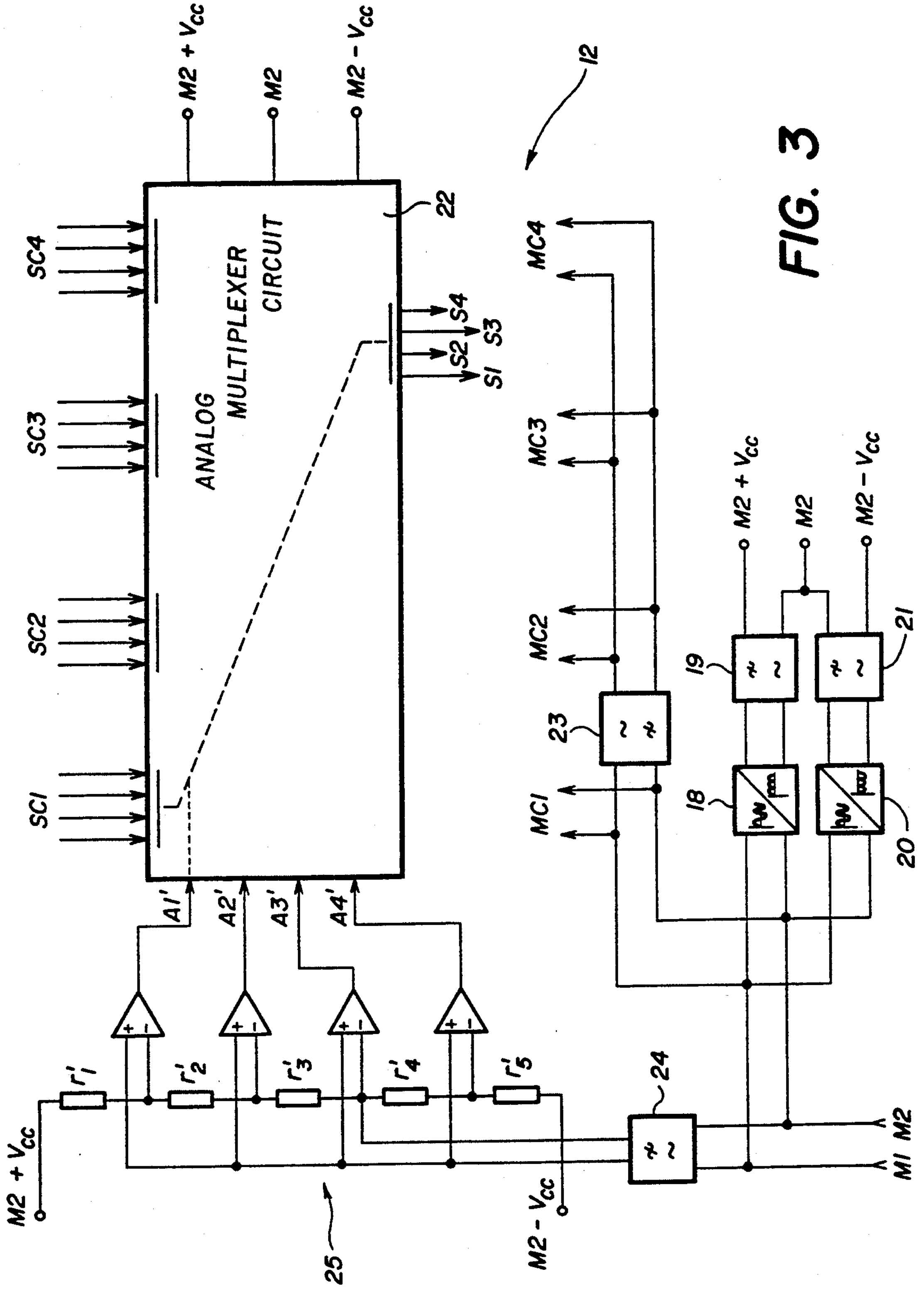
FIG. 3 is a diagram of the power transmission and multiplexer unit, which is part of the device of FIG. 1.

FIG. 3 is a simplified diagram of a power transmission and multiplexer unit 12 used in the device of FIG. 1. The voltage applied through the lines M1 and M2 is, on the one hand, rectified and filtered by the circuits 18 to 21, in order to obtain a DC supply voltage Vcc, in particular for supplying power to analog multiplexers represented by a block 22.

Further, the voltage on M1, M2, fed to the various sensors through the lines MC1 to MC4, is filtered by a high-pass filter 23 for removing the DC component, which filter can be mounted in the present example downstream of the power supply to the first sensor C1.

On the other hand, the voltage on M1, M2 is filtered by a low-pass filter 24 in order to apply the DC shift voltage to a level discriminator 25 represented schematically in FIG. 3. This discriminator sends to addressing inputs A1', A2', A3', A4' a corresponding addressing signal which causes the output signals of the respective sensor to appear on the transmission lines S1 to S4.

In the case of the sensors being supplied with a pulsed current, the detection of the DC shift voltage is preferably carried out in the interval between two consecutive pulses.

It should be noted that, generally, the multiplexing according to the invention does not actually complicate the overall structure of the present device, since it enables the use of a single analog to digital converter or similar signal processing device. On the other hand, the use of a minimal number of connection lines and, in particular, in the case of the described exemplary embodiment, the possibility of using sensors which are of a simple and economic structure, and gears with a relatively low number of teeth, provides decisive technical and economical advantages.

We claim:

1. A measuring device comprising at least two sensors for at least one value to be measured, each of said sensors being arranged so as to be connected to an electric power supply and to provide through respective output lines signals which are a function of the value to be measured, said measuring device further comprising a power transmission and multiplexer unit connected to said sensors and further connected, on the one hand, to a signal processing device by means of a number of lines at least approximately equal to the number of output lines of a single sensor and, on the other hand, to a power supply and multiplexer control device, said power supply and multiplexer control device comprising means for modulating supply voltage to be transmitted to the sensor by a multiplexer control signal, and said power transmission and multiplexer unit comprising means for discriminating said control signal.

2. A device according to claim 1 for indicating the absolute angular position of a shaft, comprising at least two position sensors each having a rotatable member, the rotatable member of a first sensor being mechanically coupled with said shaft, and the rotatable members of the other sensor or sensors being successively coupled with that of said first sensor by means of a mechanical coupling having a determined transmission ratio, these sensors being arranged to receive either a periodical symmetrical or a periodical pulse-shaped input voltage and to deliver output signals which are a function of the angular position of their rotatable member, wherein said power transmission and multiplexer control device comprises means for superposing on supply voltage to be fed to the sensors, a DC shift voltage selected among at least as many shift voltages of different values and/or polarity as the measuring device has sensors in addition to the first sensor, each of these shift voltages corresponding to a certain sensor or to a part of a certain sensor, and wherein said power transmission and multiplexer unit comprises discriminator means for determining the value and/or the polarity of the applied shift voltage, as well as means for addressing the sensor or the corresponding part of a sensor, so that the output signals from this sensor or from this part of a sensor are transmitted to the signal processing device.

3. A device according to claim 2, wherein the sensors are supplied with a pulsed current, and wherein the power transmission and multiplexer unit comprises discriminator means arranged for determining the value and/or the polarity of the shift voltage, at an instant of the supply cycle situated within the interval between two consecutive pulses.

4. A device according to claim 3, wherein said mechanical coupling between the different sensors consists of gears.

5. A device according to claim 2, wherein the first sensor is a sensor of an accuracy substantially greater than that of the other sensors of the device.

6. A device according to claim 5, wherein the first sensor consists of a resolver, the other sensors being of the inductive type with a passive rotatable member, adapted to provide output signals of the same format as the resolver.

7. A device according to claim 6, wherein said mechanical coupling between the different sensors consists of gears.

8. A device according to claim 5, wherein said mechanical coupling between the different sensors consists of gears.

9. A device according to claim 2, wherein said mechanical coupling between the different sensors consists of gears.

* * * * *